United States Patent
Engman et al.

(10) Patent No.: US 11,780,443 B2
(45) Date of Patent: Oct. 10, 2023

(54) METHOD AND SYSTEM FOR CONTROLLING AT LEAST ONE ELECTRICAL MACHINE

(71) Applicant: Scania CV AB, Södertälje (SE)

(72) Inventors: Marcus Engman, Årsta (SE); Martin Berglund, Vagnhärad (SE)

(73) Assignee: Scania CV AB, Södertälje (SE)

( * ) Notice: Subject to any disclaimer, the term of this patent is extended or adjusted under 35 U.S.C. 154(b) by 289 days.

(21) Appl. No.: 16/651,121

(22) PCT Filed: Sep. 27, 2018

(86) PCT No.: PCT/SE2018/050985
§ 371 (c)(1),
(2) Date: Mar. 26, 2020

(87) PCT Pub. No.: WO2019/070179
PCT Pub. Date: Apr. 11, 2019

(65) Prior Publication Data
US 2020/0269846 A1 Aug. 27, 2020

(30) Foreign Application Priority Data
Oct. 2, 2017 (SE) .................... 1751214-6

(51) Int. Cl.
*B60W 30/20* (2006.01)
*B60W 10/02* (2006.01)
(Continued)

(52) U.S. Cl.
CPC ............ *B60W 30/20* (2013.01); *B60W 10/02* (2013.01); *B60W 10/08* (2013.01); *B60W 20/19* (2016.01);
(Continued)

(58) Field of Classification Search
CPC .......... B60W 30/20; B60W 30/18027; B60W 30/18054; B60W 30/18063; B60W 2030/203; B60W 2030/206; B60W 10/08
See application file for complete search history.

(56) References Cited

U.S. PATENT DOCUMENTS 5,821,720 A 10/1998 Deng et al.
6,377,882 B1 4/2002 Ito
(Continued)

FOREIGN PATENT DOCUMENTS

CN 101450665 A 6/2009
CN 102536480 A 7/2012
(Continued)

OTHER PUBLICATIONS

Scania CV AB, Korean Patent Application No. 10-2020-7006876, Office Action, dated Mar. 24, 2021.
(Continued)

*Primary Examiner* — Russell Frejd
*Assistant Examiner* — Sara J Lewandroski
(74) *Attorney, Agent, or Firm* — Moore & Van Allen PLLC; W. Kevin Ransom

(57) ABSTRACT

A method and a system for a vehicle comprising: one or more power sources including at least one electrical machine; and a drivetrain for transferring torque between the one or more power sources and at least one drive wheel of the vehicle. The method comprises: controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain.

19 Claims, 11 Drawing Sheets

(51) Int. Cl.
  *B60W 10/08* (2006.01)
  *B60W 20/19* (2016.01)
  *B60W 30/18* (2012.01)

(52) U.S. Cl.
  CPC . *B60W 30/18027* (2013.01); *B60W 2510/083* (2013.01); *B60W 2510/105* (2013.01); *B60W 2540/16* (2013.01); *B60W 2710/027* (2013.01)

(56) References Cited

U.S. PATENT DOCUMENTS

| | | | |
|---|---|---|---|
| 8,315,752 | B2 | 11/2012 | Kwon et al. |
| 8,585,553 | B2 | 11/2013 | Park |
| 8,596,390 | B2 | 12/2013 | Soliman et al. |
| 9,091,219 | B2 | 7/2015 | Kar et al. |
| 2011/0136621 | A1 | 6/2011 | Nedorezov et al. |
| 2013/0066509 | A1 | 3/2013 | Nakamura et al. |
| 2015/0183420 | A1 | 7/2015 | Pettersson et al. |
| 2015/0298704 | A1 | 10/2015 | Itagaki |
| 2017/0219029 | A1 | 8/2017 | Shiozaki et al. |

FOREIGN PATENT DOCUMENTS

| | | | | |
|---|---|---|---|---|
| CN | 104540700 A | | 4/2015 | |
| DE | 102011121422 A1 | * | 6/2013 | .............. B60L 15/20 |
| DE | 102011121422 A1 | | 6/2013 | |
| EP | 1108128 A1 | | 6/2001 | |
| EP | 1186461 A1 | | 3/2002 | |
| EP | 1342610 A2 | | 9/2003 | |
| EP | 2987695 A1 | | 2/2016 | |
| GB | 2448671 A | | 10/2008 | |
| GB | 2448671 A | * | 10/2008 | .............. B60K 6/38 |
| JP | 2009012655 A | | 1/2009 | |
| JP | 2012091618 A | | 5/2012 | |
| JP | 2014042451 A | | 3/2014 | |
| KR | 20110012572 A | | 2/2011 | |
| KR | 20130036744 A | | 4/2013 | |
| KR | 20150122065 A | | 10/2015 | |
| WO | 2016207806 A1 | | 12/2016 | |

OTHER PUBLICATIONS

Scania CV AB, International Application No. PCT/SE2018/050985, International Preliminary Report on Patentability, dated Apr. 8, 2020.

Scania CV AB, International Application No. PCT/SE2018/050985, International Search Report, dated Jan. 7, 2019.

Scania CV AB, International Application No. PCT/SE2018/050985, Written Opinion, dated Jan. 7, 2019.

Scania Cv Ab, Swedish Application No. 1751214-6, Office Action, dated Feb. 11, 2019.

Scania CV AB, Swedish Application No. 1751214-6, Office Action, dated Apr. 6, 2018.

Scania CV AB, Chinese Patent Application No. 201880062636.5, First Office Action, dated Aug. 22, 2022.

* cited by examiner

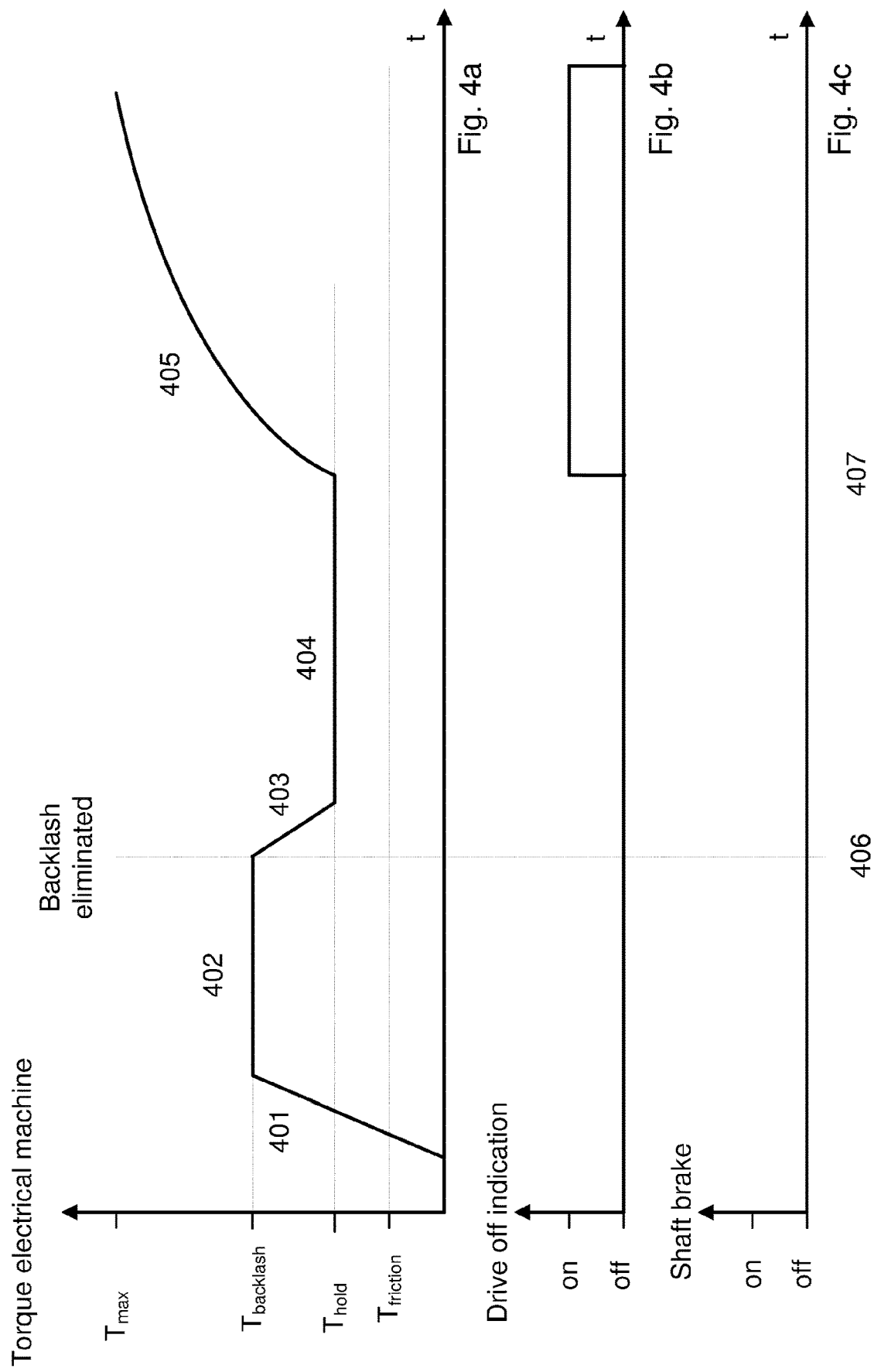

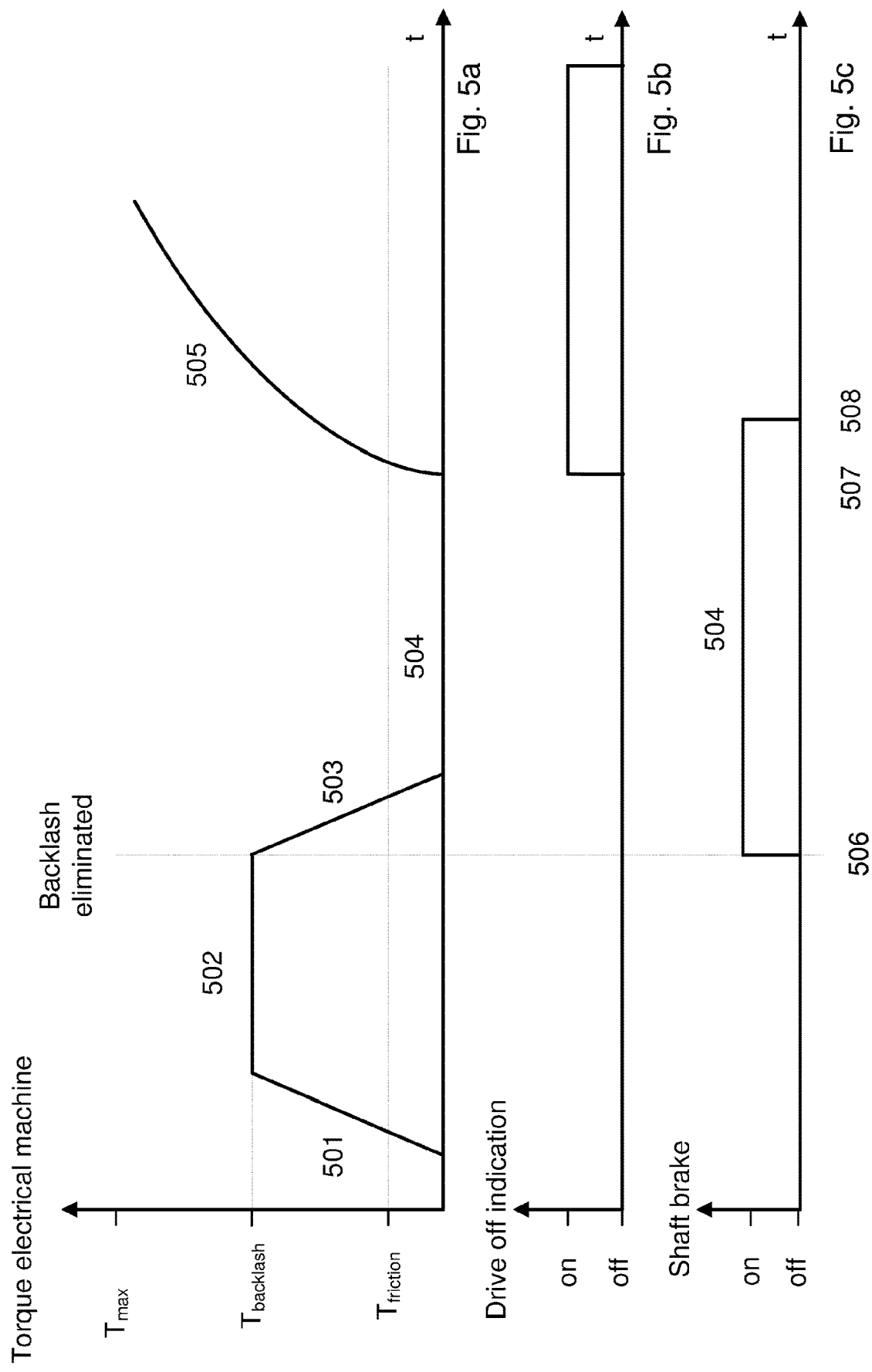

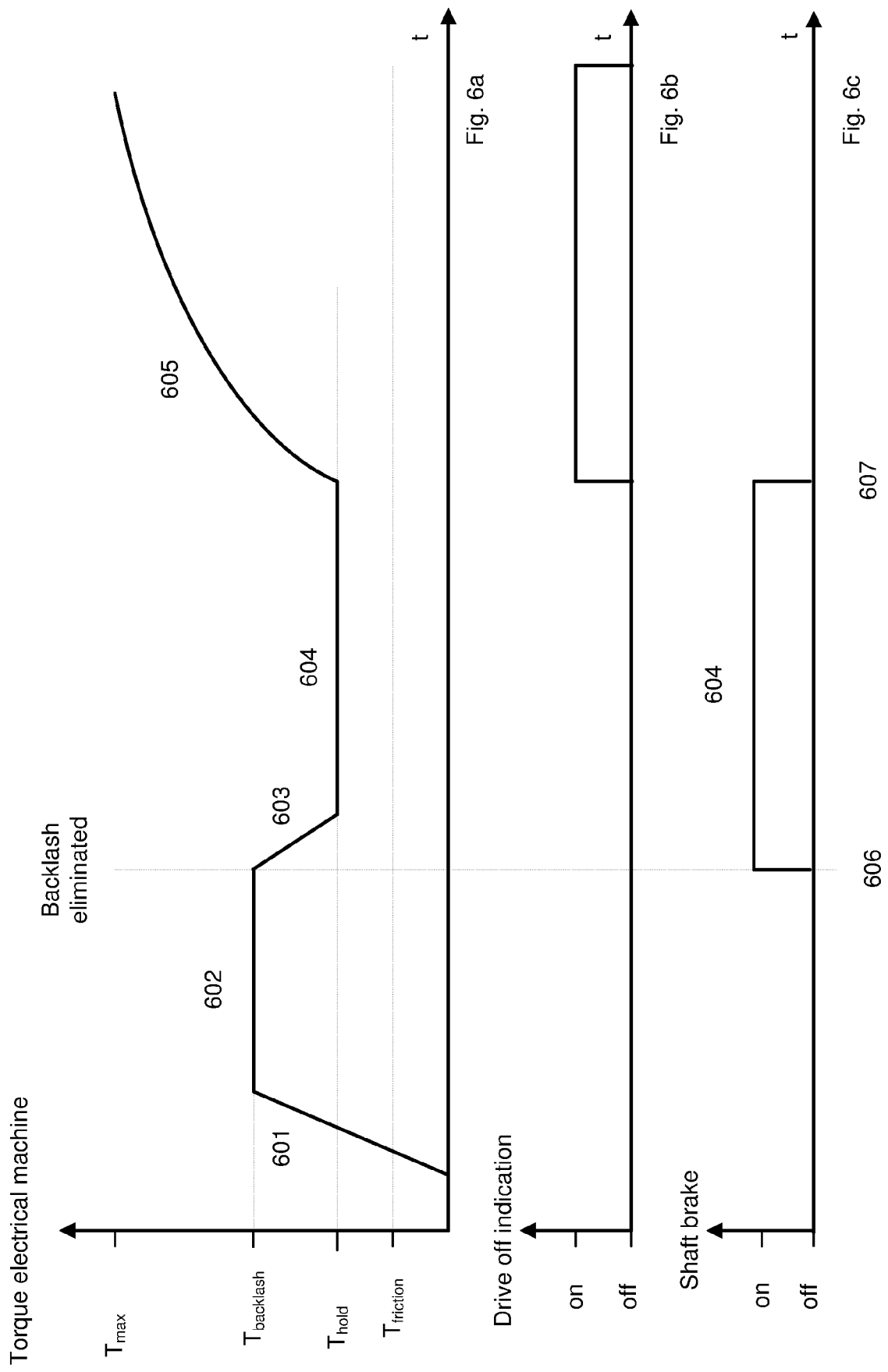

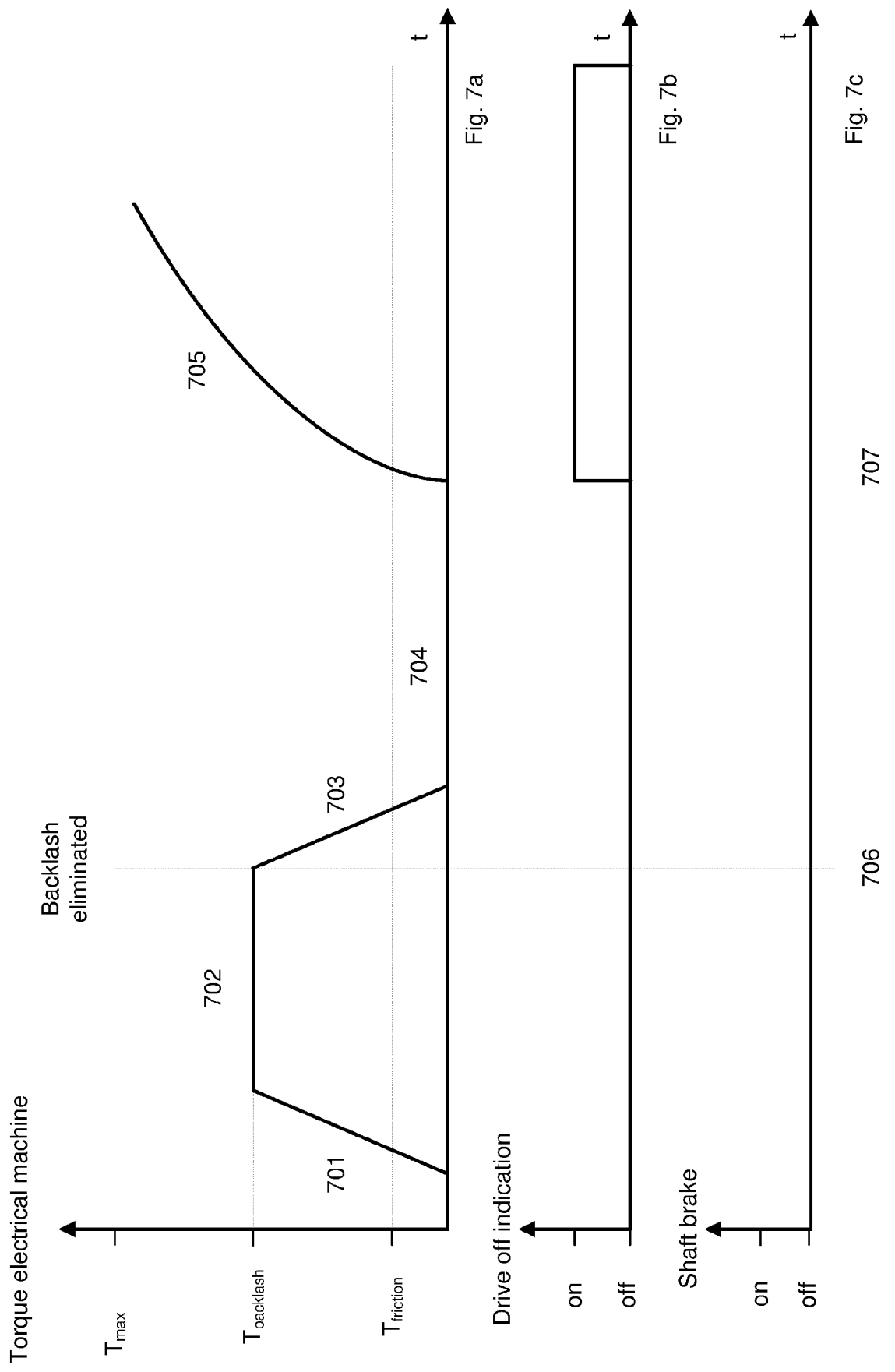

METHOD AND SYSTEM FOR CONTROLLING AT LEAST ONE ELECTRICAL MACHINE

CROSS-REFERENCE TO RELATED APPLICATION(S)

This application is a national stage application (filed under 35 § U.S.C. 371) of PCT/SE2018/050985, filed Sep. 27, 2018 of the same title, which, in turn, claims priority to Swedish Application No. 1751214-6 filed Oct. 2, 2017; the contents of each of which are hereby incorporated by reference.

FIELD OF THE INVENTION

The present invention relates to a vehicle, and in particular to a method and a system for controlling at least one electrical machine in order to eliminate backlash of a drivetrain included in a vehicle. The present invention also relates to a computer program and a computer-readable medium that implement the method according to the invention.

BACKGROUND OF THE INVENTION

The following background description constitutes a description of the background to the present invention, which does not, however, necessarily have to constitute prior art.

Vehicles, such as for example cars, buses and trucks are driven forward by a torque produced by at least one power source, such as at least one engine and/or at least one electrical machine in the vehicle. This drive torque is provided to the driving wheels of the vehicle through a powertrain/driveline/drivetrain in the vehicle. In this document, the powertrain/driveline/drivetrain is denoted drivetrain. The drivetrain includes a number of components, such as e.g. a clutch, a gearbox/transmission device, shafts, and a differential. The drivetrain may also include other components, and is described more in detail below.

One or more of the components included in the drivetrain may comprise a play/backlash, i.e. are coupled with a play/backlash. For example, different parts of a component, such as meshing gear wheels included e.g. in the gearbox and/or the differential, may have a play/backlash between them. In other words, the cogs/teeth of two interacting gear wheels of at least one drivetrain component may at some time instances be out of contact with each other, such that no torque is transferred from the at least one power source to the driving wheels. This is denoted play/backlash in this document. The play in the drivetrain may cause oscillations in torque and/or revolutions, so-called drivetrain oscillations, in the vehicle when the vehicle, for example, starts moving, stops freewheeling or stops engine motoring once a torque has been requested from the at least one power source. If the play/backlash is big/considerable, a difference $\Delta_\omega$ between a rotational speed $\omega_{shaft}$ of an input shaft of a gearbox and a rotational speed $\omega_{wheel}$ of a driving wheel of the vehicle will have time to grow big/considerable before the play/backlash can be wound up by a torque applied to/on the input shaft when the vehicle starts moving or when a positive drive torque is again transferred to the drive wheels. If the difference $\Delta_\omega$ is considerable when the play/backlash is gone/eliminated, the difference $\Delta_\omega$ may result in considerable drivetrain oscillations. Such drivetrain oscillations may cause vehicle speed variations, which may make the vehicle rock longitudinally. Such rocking movements in the vehicle are very disruptive for the driver of the vehicle.

Therefore, in some known solutions, various strategies have been used in connection with the request of engine torque in order to reduce these drivetrain oscillations. Such known strategies may utilize limiting torque ramps when the engine torque is requested. These torque ramps have then been chosen in a way that the requested engine torque is limited, such that the play/backlash is eliminated/wound up, and the drivetrain oscillations are reduced. For example, the torque ramp should, according to some known solutions, initially be limited to being relatively flat in order not to apply too much energy into the drivetrain per time unit of time, which would then result in drivetrain oscillations.

SUMMARY OF THE INVENTION

As described above, allowing the driver and/or, for example, a cruise control to freely request a torque would for known solutions often result in considerable and disruptive drivetrain oscillations. Therefore, limiting torque ramps, including a first relatively flat ramp followed by a second steeper ramp, are often used in known systems. The use of limiting torque ramps obviously slows down the torque build-up, since this is the very purpose of the limiting ramps, which also slows down the drive-off with the vehicle, e.g. slows down setting the vehicle in motion from a standstill. Thus, the use of limiting torque ramps according to known solutions results in a delayed/prolonged drivetrain torque build-up, which may be perceived by the driver as the vehicle being week and/or slow.

In order to reduce the delay e.g. in drive-offs, the clutch plates, i.e. the frictional surfaces cooperating in the clutch, may according to some known solutions be placed as closely together as possible without transferring any torque when the clutch is open, since clutch plates positioned further apart cause additional delay when closing the clutch. However, the position and control of the clutch plates, i.e. of the frictional surfaces cooperating in the clutch, are normally neither very exact nor very reliable. There is therefore a risk that the vehicle is set in unwanted motion if the inexact control of the clutch plates positions the clutch plates too closely to each other, such that an unexpectedly high torque is transferred by the clutch when the clutch should have been open. In other words, there is, for some known solutions aiming to speed up drive-offs, a risk that the clutch plates for an open clutch are positioned so close to each other that the vehicle starts moving when it should be standing still.

It is therefore one objective of the present invention to provide a method and a system for a vehicle that control a backlash of a drivetrain included in the vehicle such that these problems are at least partly solved.

According to an aspect of the present invention, this objective is achieved through the above-mentioned method for a vehicle including:
- one or more power sources including at least one electrical machine; and
- a drivetrain for transferring torque between the one or more power sources and at least one drive wheel of the vehicle;
- the method including:
- controlling, when essentially no positive drive torque $T_{drive}$ is transferred from the drivetrain to the at least one drive wheel, the at least one electrical machine to provide a backlash torque $T_{backlash}$ to the drivetrain, the backlash torque $T_{backlash}$ having a controlled value for turning the drivetrain if there is a backlash present in the drivetrain.

The controlled value of the backlash torque $T_{backlash}$ may thus be a value suitable for turning the drivetrain if there is a backlash present in the drivetrain, whereby the drivetrain is turned/rotated/winded/revolved such that the backlash is at least partly eliminated. After the backlash torque $T_{backlash}$ has been applied, it may according to an embodiment be detected that the backlash has been eliminated by the provided backlash torque $T_{backlash}$.

Hereby, a substantially even and non-oscillating torque profile, or at least a torque profile having oscillations with lower amplitudes than for known solutions, is provided. The herein presented method reduces, or even eliminates, oscillations that have a negative impact on the comfort in the vehicle. When the herein presented method is used, drivetrain oscillations may be reduced in number and/or size for drive-offs, for freewheeling endings and/or for engine motoring endings, where previously known control methods would have resulted in problematic rocking of the vehicle. A driver desires a soft and comfortable driving experience, and when such a comfortable driving experience is achieved, this gives a sense of the vehicle being a refined and well-developed product.

For example, when the vehicle is set in motion, the drivetrain is by usage of the herein disclosed embodiments more likely to be free of backlash at drive-off, which reduces the necessity of backlash related restrictions for the torque to be requested during drive-off. The backlash is here eliminated already during a standstill, whereby faster drive-offs of the vehicle are achieved. This will by the driver be perceived as the vehicle having a faster torque response and being more powerful.

Further, to be able to eliminate the backlash/play in a controlled manner also reduces the wear on components in the drivetrain, such as e.g. the wear on cog wheels.

Also, the present invention can be implemented without the need of additional hardware components in the vehicle. Thus, the present invention does not necessarily add to the hardware cost or to the hardware complexity for the vehicle.

According to an embodiment, the backlash torque $T_{backlash}$ is higher/greater than a frictional torque $T_{friction}$ of the drivetrain and is lower/smaller than a maximal torque $T_{max}$ maximally being provided by the at least one electrical machine.

Hereby, the applied backlash torque $T_{backlash}$ is able to eliminate the backlash without setting the vehicle in unwanted motion.

According to an embodiment, the method further includes:
keeping the backlash eliminated at least until a request for a drive torque $T_{drive}$ accelerating the vehicle is detected.

When the herein presented method is used, the backlash may be eliminated already when the vehicle is standing still, i.e. before drive-off, and is kept eliminated until, and during, drive-off. Therefore, little or even no attention has to be paid to a potential backlash when the vehicle drives off, since the backlash has already been eliminated during the standstill. Thus, the time periods when the vehicle is standing still and being braked anyway, such as e.g. time periods a bus is standing still at bus stops or time periods a vehicle is standing still at traffic lights, can here be used for eliminating the backlash. Since the backlash is then kept eliminated until the vehicle is later driving off after the standstill, the clutch can then be closed much faster than if the backlash would still be present in the drivetrain. Therefore, the torque limitations/restrictions having been used at drive-offs in known solutions can here be omitted.

According to an embodiment, the keeping of the backlash eliminated is achieved by at least one in the group of:
applying a braking torque $T_{brake}$ on a shaft of a gearbox included in the drivetrain;
providing, by use of the at least one electrical machine, a holding torque $T_{hold}$ to the drivetrain; and
a friction of a gearbox of the drivetrain.

Hereby, the backlash may securely be kept eliminated until drive-off in various situations and for various vehicle implementations. The usage of the internal gear box friction is a low complexity alternative, while usage of the braking torque $T_{brake}$ and/or the holding torque holding torque $T_{hold}$ more safely prevents unwanted drive-offs and facilitates faster dirve-off accelerations.

When the braking torque $T_{brake}$ and/or the holding torque $T_{hold}$ are applied on the gearbox shaft and/or drivetrain, respectively, during e.g. a standstill, the above-mentioned problems of inexactness and unreliability of the clutch regarding the position and control of the clutch plates are mitigated. When the braking torque $T_{brake}$ is applied on the gearbox shaft, the clutch torque can easily be controlled to a value for which the vehicle does not start moving. Thus, the risk for the vehicle being set in unwanted motion due to inexact and unreliable control of the clutch plates is eliminated. As a result of this, the clutch plates can also in a secure way be positioned closer to each other for an open clutch when the embodiment is utilized than was possible for known solutions. To have the clutch plates positioned closer to each other for the open clutch facilitates faster closing of the clutch, and thus also faster drive-offs for the vehicle, whereby the driver perceives the vehicle as powerful. Thus, a positive and backlash free torque is provided, which results in quick drive-offs being free of drivetrain oscillations.

According to an embodiment, the method further includes:
transferring, when the backlash is still eliminated in the drivetrain, a drive torque $T_{drive}$ accelerating the vehicle from the drivetrain to the at least one drive wheel.

Since the backlash is kept eliminated until e.g. the vehicle is driving off after a standstill, the clutch can be closed much faster and/or the torque provided by the at least one electrical machine can be increased much faster, than if the backlash would still be present in the drivetrain, wherefore a much more aggressive acceleration may be possible without annoying drivetrain oscillations.

According to an embodiment, the controlling of the at least one electrical machine further includes:
providing the backlash torque $T_{backlash}$ to the drivetrain;
detecting that the drivetrain is turning as a result of the provided backlash torque $T_{backlash}$;
detecting that the drivetrain stops turning;
determining, based on the detection of the stopped turning of the drivetrain, that the backlash has been eliminated; and
controlling the provided backlash torque $T_{backlash}$ to decrease.

Hereby, the elimination of the backlash is more efficiently and more safely performed under more precise control and closer monitoring. It should be noted that the steps of this embodiment do not have to be performed in this order. For example, the provided backlash torque $T_{backlash}$ may be controlled to decrease before the determination that the drivetrain stops turning and/or before the determination that the backlash has been eliminated.

According to an embodiment, the controlling of the at least one electrical machine to provide a backlash torque $T_{backlash}$ to the drivetrain further includes:

- determining a direction of an upcoming acceleration of the vehicle; and
- controlling the at least one electrical machine to provide a backlash torque $T_{backlash}$ to the drivetrain such that the backlash is eliminated in the direction of the upcoming acceleration.

It is hereby ensured that the backlash/play is eliminated in the correct direction, i.e. in a direction the drivetrain will subsequently be rotated after the standstill, motoring or freewheeling.

According to an embodiment, the determining of the direction is based on one or more in the group of:

- a gear selector indication;
- information related to a road section ahead of the vehicle; and
- information related to an upcoming usage of the vehicle.

When the direction in which the drivetrain should be turned/rotated is determined based on these indicators and/or information, the risk for an incorrect direction determination is reduced. Thus, the drivetrain will essentially always be rotated in the direction corresponding to the upcoming usage of the vehicle, which reduces the risk for drivetrain oscillations.

According to an embodiment, the method further includes:

- controlling at least one clutch included in the drivetrain to a slipping position $C_{slip\_clutch}$, in which slipping position $C_{slip\_clutch}$ the at least one clutch transfers a backlash clutch torque $T_{backlash\_clutch}$ having a controlled value for eliminating the backlash.

When also the at least one clutch transfers a backlash clutch torque $T_{backlash\_clutch}$, the electrical machine is helped in the elimination of the backlash. This may be needed in some implementations, since the rotational inertia of the electrical machine is relatively small. When also the backlash clutch torque $T_{backlash\_clutch}$ is utilized for rotating the drivetrain, the much greater rotational inertia of the combustion engine may be taken advantage of for achieving the rotation.

According to an embodiment, the backlash clutch torque $T_{backlash\_clutch}$ is lower/smaller than a torque $T_{closed\_clutch}$ being transferred by the clutch in a closed position $C_{closed\_clutch}$ for the clutch, i.e. the clutch is in a slipping position when the backlash clutch torque $T_{backlash-clutch}$ is transferred.

Hereby, it is ensured that the applied backlash clutch torque $T_{backlash\_clutch}$ is able to eliminate the backlash without setting the vehicle in unwanted motion.

According to an embodiment, essentially no drive torque $T_{drive}$ is transferred from the drivetrain to the at least one drive wheel during one or more in the group of:

- a vehicle standstill; and
- a movement of the vehicle which is caused by a kinetic energy of the vehicle without torque being transferred from the one or more power sources to the at least one drive wheel.

Thus, the backlash is by the herein described embodiments eliminated in connection with at least a vehicle standstill situation, an engine motoring situation (i.e. when the engine is dragging), or a freewheeling situation. Hereby, the backlash elimination does not affect the driving performance of the vehicle.

According to an aspect of the present invention, the objective is achieved through the above-mentioned system for a vehicle. The vehicle includes:

- one or more power sources including at least one electrical machine;
- a drivetrain for transferring torque between the one or more power sources and at least one drive wheel of the vehicle;
- the system including means for:
  - controlling, when essentially no positive drive torque $T_{drive}$ is transferred from the drivetrain to the at least one drive wheel, the at least one electrical machine to provide a backlash torque $T_{backlash}$ to the drivetrain, the backlash torque $T_{backlash}$ having a controlled value for turning the drivetrain if there is a backlash present in the drivetrain.

It will be appreciated that all the embodiments described for the method aspect of the invention are applicable also to the system aspect of the invention.

According to an aspect of the present invention, a vehicle including a system as described herein and configured to eliminate a backlash of a drivetrain included in the vehicle is presented.

According to an aspect of the present invention, the above-mentioned computer program and computer-readable medium are configured to implement the method embodiments described herein.

BRIEF DESCRIPTION OF THE DRAWINGS

Embodiments of the invention will be illustrated in more detail below, along with the enclosed drawings, where similar references are used for similar parts, and where:

FIGS. 4a-c show non-limiting illustrations related to a start from standstill, used for explaining various embodiments of the present invention, FIGS. 5a-c show non-limiting illustrations related to a start from standstill, used for explaining various embodiments of the present invention, FIGS. 6a-c show non-limiting illustrations related to a start from standstill, used for explaining various embodiments of the present invention, FIGS. 7a-c show non-limiting illustrations related to a start from standstill, used for explaining various embodiments of the present invention.

DETAILED DESCRIPTION OF THE INVENTION

Figure 1A:
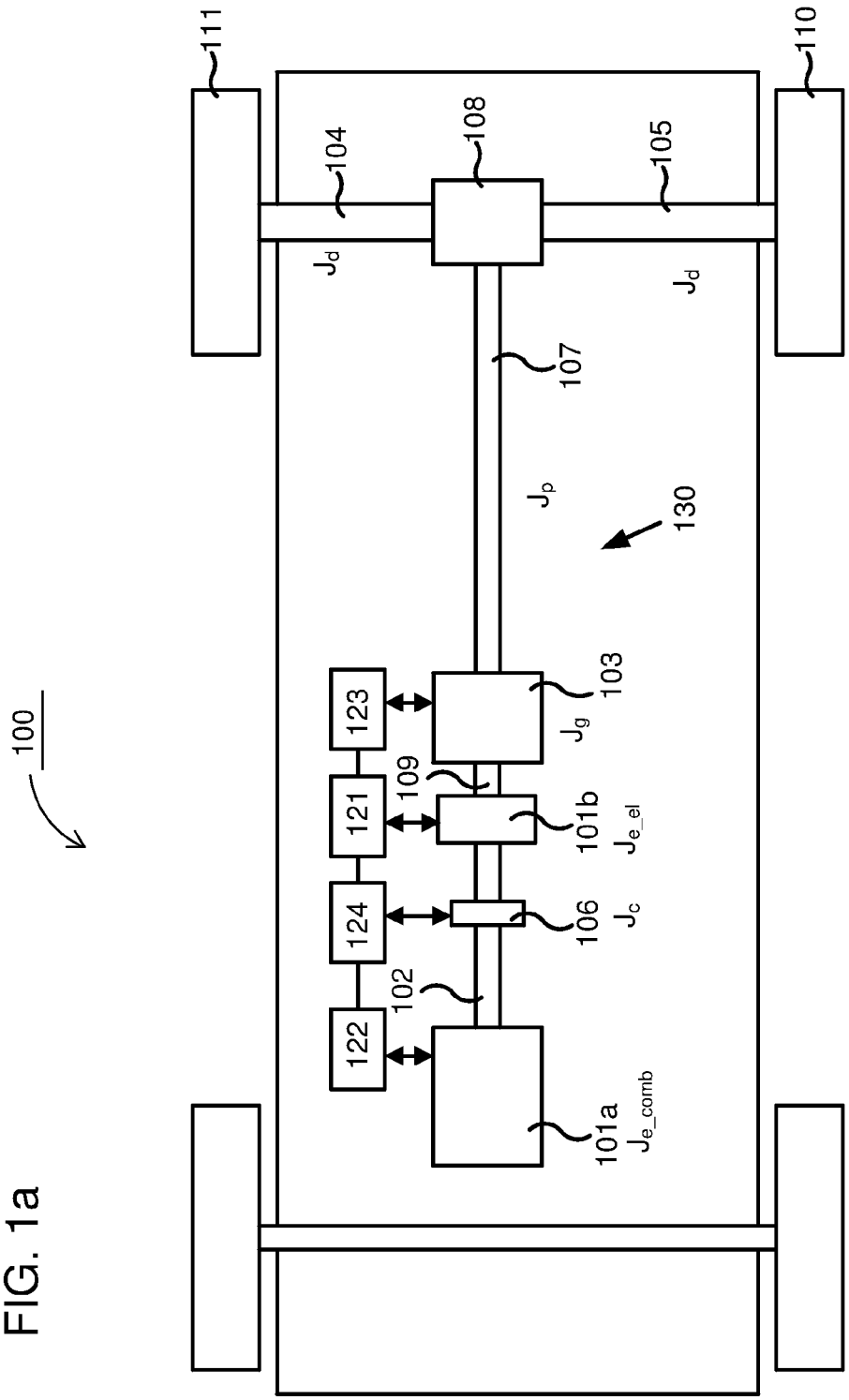
FIGS. 1a-c show example vehicles, in which embodiments of the present invention may be implemented.
Figure 1B:
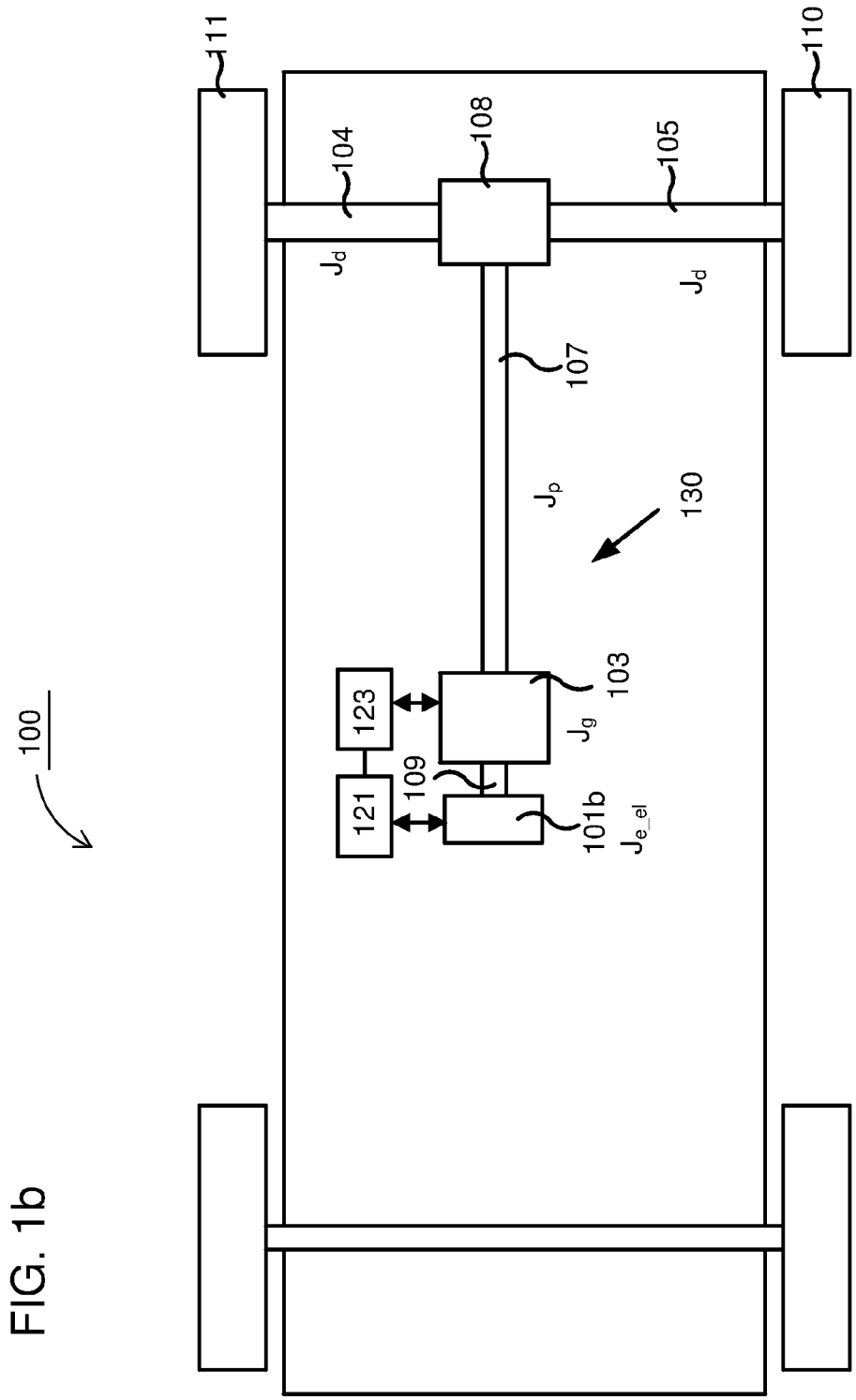
Figure 1C:
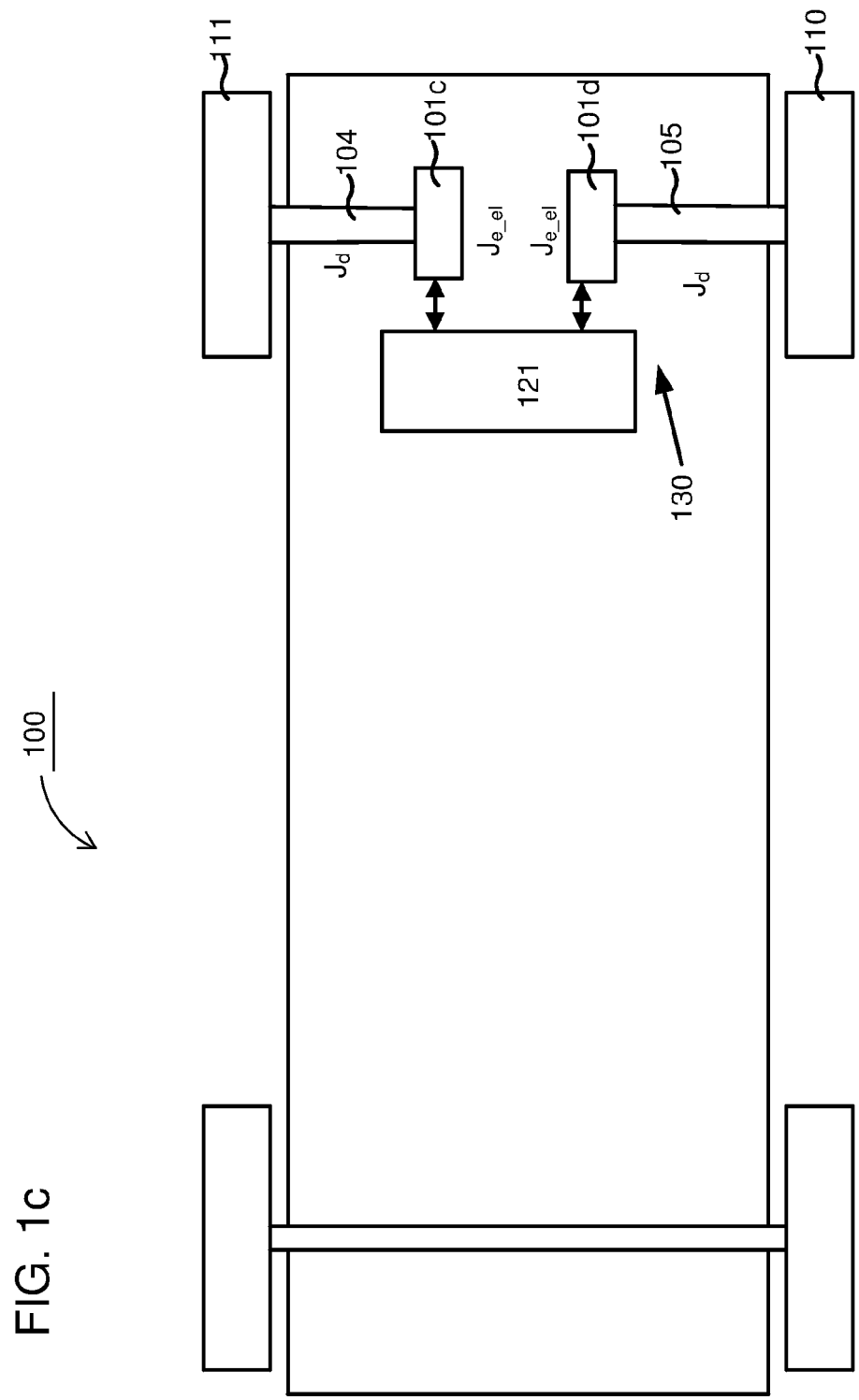

FIGS. 1a-c schematically show heavy example vehicles 100, such as trucks, buses or similar, which will be used to explain the herein presented embodiments. The embodiments are, however, not limited to use in heavy vehicles as the ones shown in FIGS. 1a-c, but may also be used in lighter vehicles such as passenger cars.

A vehicle 100, as shown schematically in FIGS. 1a-c, comprises a pair of drive wheels 110, 111. The vehicle furthermore comprises a drivetrain 130 configured to transfer a torque between at least one power source 101a, 101b, 101c and the drive wheels 110, 111. The at least one power source may, according to some embodiments, include with a combustion engine 101a, at least one electrical machine 101b, 101c, or a combination of these, implementing a so-called hybrid drive.

In FIG. 1a, a hybrid drive is schematically illustrated, including a combustion engine 101a, which for example in a customary fashion, via an output shaft 102 of the engine 101, is connected to a clutch 106, and via the clutch also to a gearbox 103. At least one electrical machine 101b is further connected between the clutch 106 and the gearbox 103. The torque provided by the combustion engine 101a and/or by the at least one electrical machine 101b is provided to an input shaft 109 of the gearbox 103. A propeller shaft 107, connected to an output shaft of the gearbox 103, drives the drive wheels 110, 111 via a central gear 108, such as e.g. a customary differential, and drive shafts 104, 105 connected with the central gear 108.

In FIG. 1b, an electrical drive is schematically illustrated, including at least one electrical machine 101b connected to the gearbox 103. The torque provided by the at least one electrical machine 101b is provided to an input shaft 109 of the gearbox 103. A propeller shaft 107, connected to an output shaft of the gearbox 103, drives the drive wheels 110, 111 via a central gear 108, such as e.g. a customary differential, and drive shafts 104, 105 connected with the central gear 108.

In FIG. 1c, an electrical drive is schematically illustrated, including at least one electrical machine 101b connected to at least one of the drive shafts 104, 105 driving the drive wheels 110, 111, respectively.

In FIGS. 1a-c, control units 121, 122, 123, 124 are schematically illustrated as receiving signals and/or providing control signals from and/or to the at least one power source 101a, 101b, 101c, the clutch 106 and/or the gearbox 103. The control units 121, 122, 123, 124 are described in more detail below.

Figure 2A:
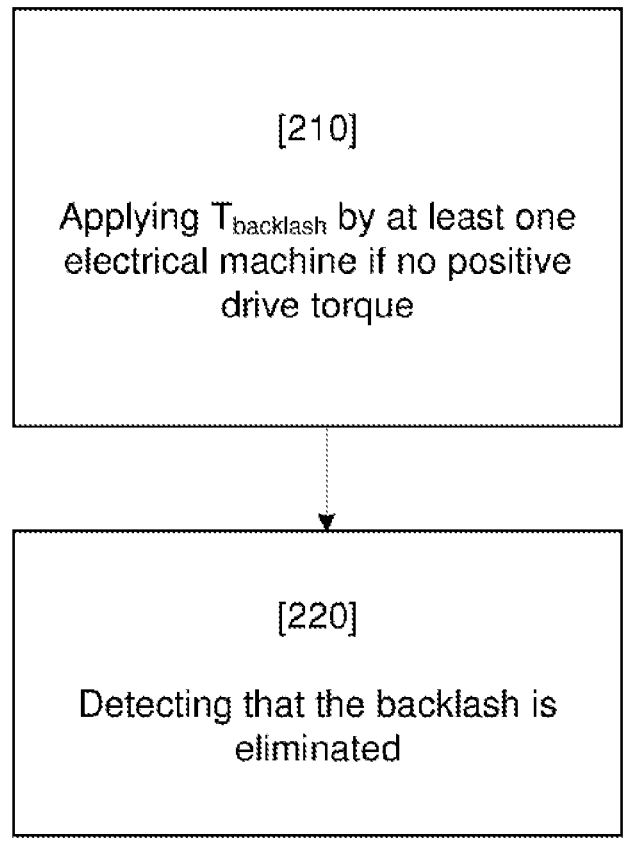
FIGS. 2a-b show flow charts for methods according to various embodiments of the present the invention, FIGS. 3a-c schematically illustrate a play in the drivetrain.

FIG. 2a shows a flow chart for a method 200 for a vehicle 100, according to an embodiment of the present invention.

In a first step 210, when essentially no positive drive torque $T_{drive}$ is transferred from the drivetrain 130 to the at least one drive wheel 110, 111, the at least one electrical machine 101b, 101c, 101d is controlled to provide a backlash torque $T_{backlash}$ to the drivetrain 130. Thus, the backlash torque $T_{backlash}$ is provided to the drivetrain 130 by the at least one electrical machine 101b, 101c, 101d when a backlash may be present in the drivetrain, e.g. when the vehicle 100 is standing still, is freewheeling or is driven by engine motoring, i.e. is moved by a kinetic energy of the vehicle without any torque being provided from the one or more power sources 101a, 101b, 101c to the at least one drive wheels 110, 111. The backlash torque $T_{backlash}$ may thus be provided e.g. to the input shaft 109 of the gearbox and/or to the drive shafts 104, 105 of the drivetrain 130, as illustrated in FIGS. 1a-c. The backlash torque $T_{backlash}$ has a controlled value suitable for turning the drivetrain 130 if there is a backlash present in the drivetrain 130. Thus, by the applied backlash torque $T_{backlash}$, the drivetrain is turned/rotated/winded/revolved such that the backlash is eliminated.

In a second step 220, which is performed according to an embodiment, it is detected that the backlash is eliminated by the provided backlash torque $T_{backlash}$. The detection may e.g. be based on a rotation of the drivetrain, such that the backlash elimination is detected when the drivetrain 130 stops turning/rotating. The detection may also be based on an analysis of a value of a from an electrical machine provided dynamic electrical torque $T_{el,dynamic}$, such that an elimination of the backlash is detected when the dynamic electrical torque $T_{el,dynamic}$; $T_{el,dynamic}=T_{el}-J_{e\_el}*\dot{\omega}_{el}$; is increasing rapidly. Here, $T_{el}$ is the electrical torque provided by the at least one electrical machine, $J_{e\_el}$ is the rotational inertia of the at least one electrical machine about its own shaft, and $\dot{\omega}_{el}$ is the acceleration of the engine speed of the at least one electrical machine.

By the use of the presented method, an efficient and reliable elimination of potential backlash/play in the drivetrain is achieved when no drive torque $T_{drive}$ is transferred from the drivetrain 130 to the at least one drive wheel 110, 111, e.g. during a vehicle standstill and/or a movement of the vehicle 100 which is caused by a kinetic energy of the vehicle 100 without torque being transferred from the one or more power sources 101a, 101b, 101c, 101d to the at least one drive wheel 110, 111. As a non-limiting example, the central gear may have to be turned/rotated up to approximately 30° in order for the backlash therein to be eliminated. Correspondingly, for the lowest gear (e.g. gear 1 or a so-called crawl/crawler gear) of the gearbox, a rotation of up to approximately 480° may have to be performed in order to eliminate the backlash. For a direct gear, e.g. a highest gear of a gearbox, for which the input 109 and output 107 shafts rotate with the same speed, and a torque is transferred through the gearbox without a gear ratio, a rotation of up to approximately 30° may eliminate the backlash.

Also, a quick and reliable start from a standstill, also called a drive-off, is achieved. Thus, a quick and safe start from a standstill, without drivetrain oscillations, can be provided by the present invention. This is possible since the backlash has been eliminated already during the standstill, whereby backlash related limitations on the torque build-up can be omitted, and since the clutch plates can be positioned close to each other for the open clutch, which makes closing of the clutch faster.

According to an embodiment, the backlash torque $T_{backlash}$ being provided to the drivetrain in order to eliminate the backlash has a value being higher than a frictional torque $T_{friction}$ of the drivetrain 130, such that the backlash torque $T_{backlash}$ is able to turn/rotate the drivetrain. The backlash torque $T_{backlash}$ is also lower than a maximal torque $T_{max}$ maximally being providable by the at least one electrical machine 101b, 101c, 101d. For example, if the vehicle is standing still, the backlash torque $T_{backlash}$ should be low enough for not being able to set the vehicle in motion. Thus, if the vehicle is standing still without activated brakes, the backlash torque $T_{backlash}$ should be lower than a rolling resistance for the vehicle. Correspondingly, if the vehicle is standing still with activated brakes, the backlash torque $T_{backlash}$ should be lower than a combination of the rolling and braking resistances for the vehicle. For a freewheeling or engine motoring vehicle, the backlash torque $T_{backlash}$ should be lower than a torque accelerating the vehicle. In other words, the backlash torque $T_{backlash}$ should be high enough to exceed the frictional torque $T_{friction}$ of the drivetrain 130, thereby causing turning/rotation of the drivetrain, and should be low enough to not causing an acceleration and/or setting in motion of the vehicle 100.

As described above, play/backlash in the drivetrain may, for example, arise when two cogs in the drivetrain, such as for example the cogs of two cogwheels in the gearbox, do not engage/mesh with each other. Situations in connection with which backlash may occur thus include standstills, freewheeling, and engine motoring, since essentially no positive drive torque is then provided to the drive wheels from the drivetrain/power sources.

Figure 3A:
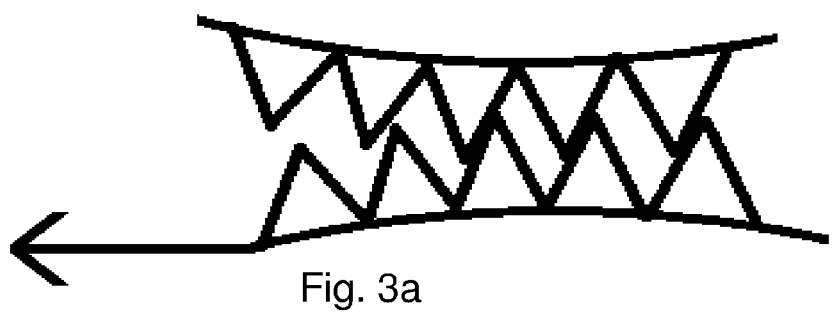
Figure 3B:
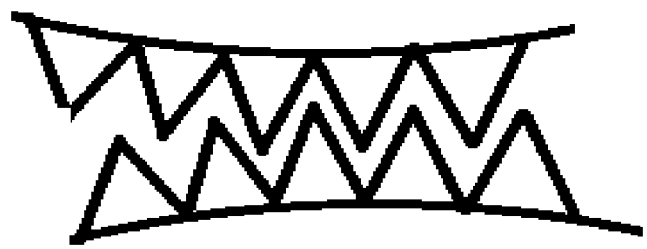
Figure 3C:
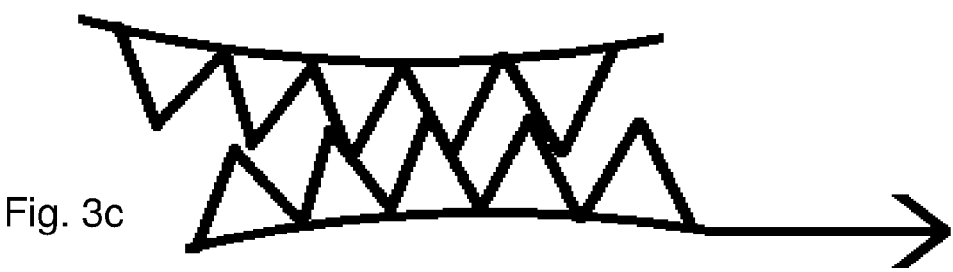

The position of the cogwheels in relation to each other during and outside of the play is schematically illustrated in FIGS. 3a-c. The cogs of the cogwheels make contact in a first shaft position, during rotation in a first direction, as illustrated in FIG. 3a, in a position corresponding to a maximum backward turn. The cogs in the cogwheels also make contact in a third shaft position, during rotation in a second direction, as illustrated in FIG. 3c, in a position corresponding to a maximum forward turn. Therefore, the cogs are engaged/meshed in both these positions (illustrated in FIGS. 3a and 3c respectively), which also means that the play is rotated backwards and forwards respectively. The play in the drivetrain is made up of the rotation angle when the cogs are not engaged/meshed with each other, that is to say the angle range between the first and third shaft positions, corresponding to a second position/angle within the play, illustrated in FIG. 3b. Thus, no torque is transmitted during the play, since the cogs do not engage with each other in this second gear/position. It should be noted that FIGS. 3a-c illustrate, in a schematic and simplified manner, a play between only two cogwheels, and that a drivetrain may comprise connections between more than two cogwheels, as described above. However, FIGS. 3a-c may be used to explain, in principle, the occurrence of a play between any two cogwheels in the drivetrain.

A backlash/play may thus, for example, occur at a transition between freewheeling or dragging the engine, i.e. engine motoring, and an acceleration/torque request when engaging the clutch, or in connection with a drive-off/start from a standstill. Since an efficient elimination/winding up of such a play may be provided by the use of the herein described embodiments, a rapid torque build-up may be obtained at drive-offs.

Figure 2B:
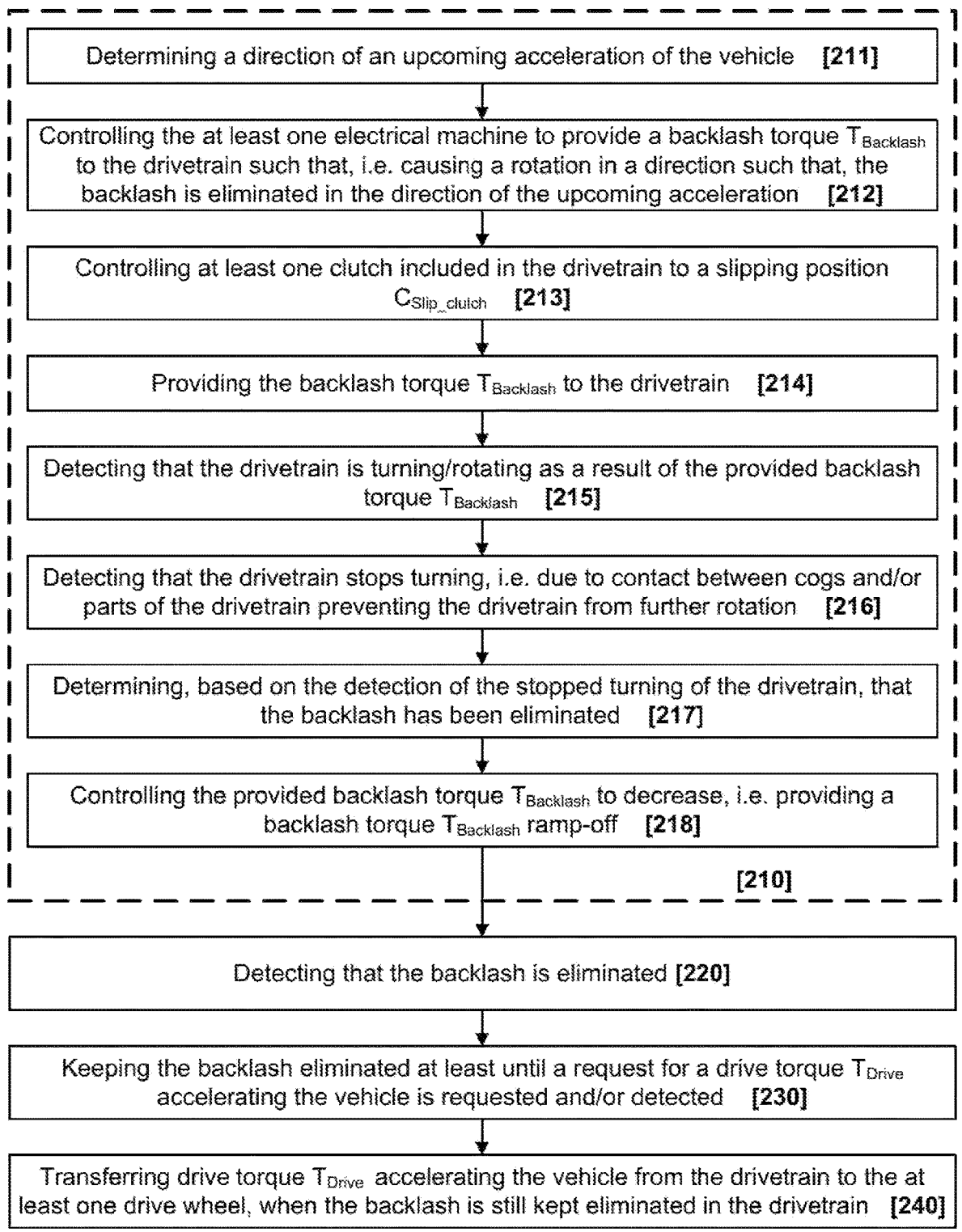

FIG. 2b shows a flow chart for a method for a vehicle 100, according to a number of embodiments of the present invention.

In a first step 210, the at least one electrical machine 101b, 101c, 101d is controlled to provide a backlash torque $T_{backlash}$ to the drivetrain 130 when essentially no positive drive torque $T_{drive}$ is transferred from the drivetrain 130 to the at least one drive wheel 110, 111, as described above.

In a second step 220, which is performed according to an embodiment, it is detected that the backlash is eliminated by the provided backlash torque $T_{backlash}$, as described above.

In a third step 230, according to an embodiment, the backlash is kept eliminated at least until a request for a drive torque $T_{drive}$ accelerating the vehicle 100 is requested and/or detected. Thus, according to the embodiment, it is prevented that a backlash reoccurs after it has been eliminated, since the backlash is kept eliminated until the vehicle should be set in motion or accelerated by the at least one power source 101a, 101b, 101c, 101d.

In a fourth step 240, according to an embodiment, a drive torque $T_{drive}$ accelerating the vehicle 100 is transferred from the drivetrain 130 to the at least one drive wheel 110, 111, when the backlash is still kept eliminated in the drivetrain 130.

The backlash may, according to an embodiment, be kept eliminated by an internal friction of the gearbox 103 of the drivetrain 130. Thus, the friction here prevents the drivetrain 130 from rotating once the backlash has been eliminated, whereby the backlash/play is kept eliminated without applying any further torque.

The backlash may also, according to an embodiment, be kept eliminated by applying a braking torque $T_{brake}$ on a shaft 109, 902, 905 of a gearbox 103 (illustrated in FIG. 9) included in the drivetrain 130, thereby preventing the drivetrain from moving.

According to an embodiment of the present invention, the braking torque $T_{brake}$ is applied by activating at least one shaft brake arrangement 901 acting on a shaft 109 of the gearbox 103 included in the drivetrain 130. Essentially any kind of brake arrangement 901 which directly or indirectly acts on a shaft included in the gearbox, such as e.g. on a shaft 109 connected to the clutch 106, can be utilized for providing this braking Torque $T_{brake}$. The shaft brake arrangement 901 is configured to be able to provide a higher/greater maximal braking torque $T_{brake\_max}$, e.g. 200 Nm as a non-limiting example, than the braking torque $T_{brake}$, e.g. 100 Nm as a non-limiting example, which according to an embodiment of the present invention is applied on the shaft in order to keep the drivetrain 130 free of backlash. The braking torque $T_{brake}$ may e.g. have a value guaranteeing that the vehicle is not set in motion from a standstill.

Figure 9:
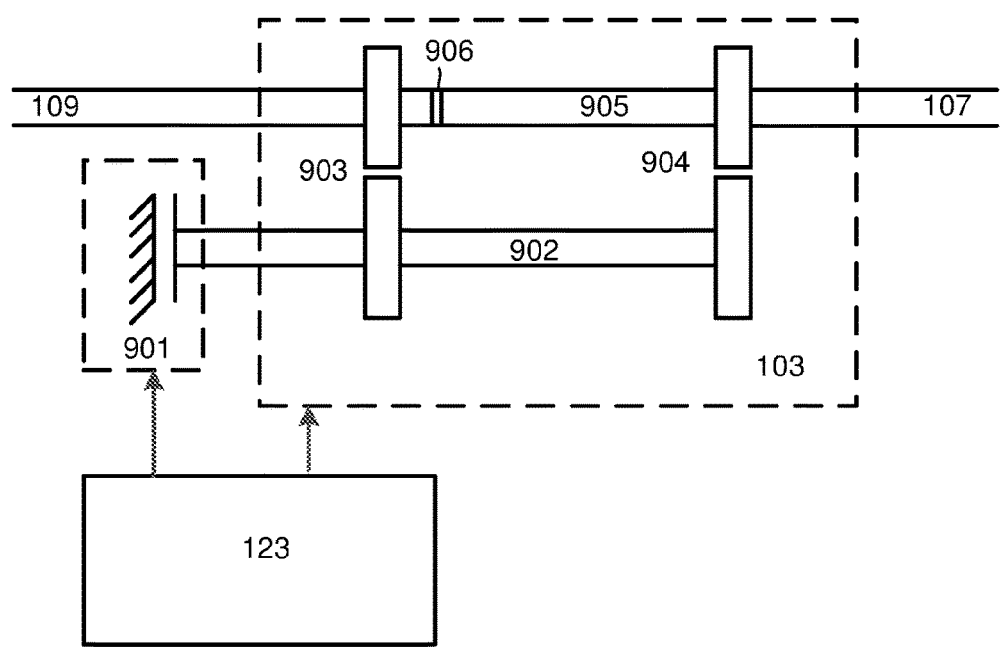

A non-limiting example of such a shaft brake arrangement 901 is schematically illustrated in FIG. 9. A shaft brake arrangement can be arranged in a number of ways, as long as a braking torque $T_{brake}$ is applied to at least one shaft included in the gearbox 103. The braking torque $T_{brake}$ can, according to various embodiments, be applied to the input shaft 109, to the main/transmission shaft 905 and/or to another shaft being connected to the input shaft via at least one gear wheel meshing, such as a lay shaft 902. FIG. 9 schematically illustrates one non-limiting example of a gearbox 103 including an input shaft 109, a lay shaft 902, and a main/transmission shaft 905 being journaled to the input shaft 109 in bearings 906. Also, a lay shaft brake 901, configured to apply a braking torque to a lay shaft 902, is schematically illustrated. The lay shaft 902 is here braked by the lay shaft brake 901, and the braking force $T_{brake}$ is then provided to the input shaft 109 of the gearbox 103 via one or more gear wheel meshes 903, 904. The shaft brake arrangement may be constructed in a number of ways, and is not limited to the schematic illustration of FIG. 9. For instance, an input shaft brake arrangement may be arranged for braking the input shaft 109 with a braking force $T_{brake}$ and/or a main shaft brake arrangement may be arranged for braking the main shaft 905 with a braking force corresponding to the input shaft braking force $T_{brake}$.

As described in this document, the shaft brake arrangement, such as an input shaft brake arrangement, a lay shaft brake arrangement and/or a main shaft brake arrangement, may be controlled by a gearbox control unit 123.

The braking torque $T_{brake}$ being applied on the shaft, i.e. on the input shaft 109, on the lay shaft 902 and/or the main shaft 905, is according to an embodiment controlled to be high enough for keeping the backlash eliminated, i.e. to keep the backlash eliminated when the shaft, i.e. one of more of the input, main and lay shafts, are standing still. Also, the backlash torque $T_{backlash}$ should be controlled to be low enough for not setting a still standing vehicle 100 in motion. Hereby, it may be ensured that the vehicle does not perform an unwanted drive-off. Thus, the backlash torque $T_{backlash}$ being applied when the shaft brake arrangement 901 is activated winds up the drivetrain in order to eliminate the backlash. When the shaft brake arrangement 901 is activated, the drivetrain 130 will stay in this wound-up state, and the backlash torque $T_{backlash}$ is maintained and still applied on the drivetrain, but now by the shaft brake arrangement 901 instead. Thus, since the backlash torque $T_{backlash}$ is controlled to be low enough for not setting the vehicle 100 in motion, an unwanted drive-off can be prevented. Thus, a quick and safe start from a standstill, without drivetrain oscillations, can be provided by the embodiment, since the backlash has been eliminated already during the standstill.

The backlash may also, according to an embodiment, be kept eliminated by providing, by use of the at least one electrical machine 101b, 101c, 101d, a holding torque $T_{hold}$ to the drivetrain 130, which prevents the drivetrain from moving. Thus, the at least one electrical machine may be used for keeping the drivetrain in a backlash free position, i.e. by holding the drivetrain in position by use of an applied holding torque $T_{hold}$ being applied to the drivetrain. The holding torque $T_{hold}$ is, according to an embodiment, controlled to be high enough for keeping the backlash eliminated, i.e. to keep the drivetrain in its wound-up state. Also, as mentioned above, the backlash torque $T_{backlash}$ should be controlled to be low enough for not setting a still standing vehicle 100 in motion, whereby it may be ensured that the vehicle does not perform an unwanted drive-off. Thus, a quick and safe start from a standstill, without drivetrain oscillations, can be provided by the embodiment.

As illustrated in FIG. 2b, the above mentioned first step 210 of controlling 210 the at least one electrical machine 101b, 101c, 101d may, according to various embodiments, include one or more of the below described steps 211, 212, 213, 214, 215, 216, 217, 218.

According to an embodiment, the controlling 210 of the at least one electrical machine 101b, 101c, 101d includes the steps of:

providing 214 the backlash torque $T_{backlash}$ to the drivetrain 130, where the backlash torque $T_{backlash}$ has a value as described above;

detecting 215 that the drivetrain 130 is turning/rotating as a result of the provided backlash torque $T_{backlash}$, i.e. detecting that there is backlash present and that the backlash elimination has started;

detecting 216 that the drivetrain 130 stops turning, i.e. due to contact between cogs and/or parts of the drivetrain preventing the drivetrain from further rotation;

determining 217, based on the detection 216 of the stopped turning of the drivetrain 130, that the backlash has been eliminated; and controlling 218 the provided backlash torque $T_{backlash}$ to decrease, i.e. providing a backlash torque $T_{backlash}$ ramp-off.

The smooth decrease of provided backlash torque $T_{backlash}$ reduces the risk for comfort problems, oscillations and/or noises of the drivetrain/gearbox. For example, if the provided backlash torque $T_{backlash}$ would be abruptly removed, e.g. essentially immediately eliminated, the drivetrain could possibly bounce back if there is no braking $T_{brake}$ or holding torque $T_{hold}$ applied. Also, the engagement of the at least one electrical machine may cause annoying noises if the provided backlash torque $T_{backlash}$ would be abruptly removed.

Here, the provided backlash torque $T_{backlash}$ may also be controlled 218 to be decreased before the determination 216 of that the drivetrain stops turning and/or before the determination 217 of that the backlash has been eliminated.

Alternatively, as mentioned above, a determination of the eliminated backlash may also be performed based on an analysis of a detected electrical machine torque, e.g. by detecting an elimination of the backlash if a dynamic electrical torque $T_{el,dynamic}$ is increasing rapidly, as explained above.

According to an embodiment, the first step 210 of controlling the at least one electrical machine 101b, 101c, 101d to provide a backlash torque $T_{backlash}$ to the drivetrain 130 further includes the steps, preferably preceding step 214, of:

determining 211 a direction of an upcoming acceleration of the vehicle 100; and controlling 212 the at least one electrical machine 101b, 101c, 101d to provide a backlash torque $T_{backlash}$ to the drivetrain 130 such that, i.e. causing a rotation in a direction such that, the backlash is eliminated in the direction of the upcoming acceleration.

Hereby, it is ensured that the backlash/play is wound up in the correct direction, i.e. in the direction in which the drivetrain will provide torque to the drive wheels after the standstill, freewheeling and/or engine motoring have come to an end.

The determination of the direction is, according to an embodiment, based on a gear selector indication, i.e. based on if the gear selector indicates an upcoming forward or backward movement.

The determination of the direction is, according to an embodiment, based on information related to a road section ahead of the vehicle 100. Such information may be related to essentially any parameter being relevant for influencing and/or determining the usage and/or behavior of the vehicle when travelling on the road section. Thus, based on such information, it may for example be determined that an acceleration will soon be requested in a forward direction, e.g. due to an upcoming uphill slope or an upcoming increased speed limit, whereby the backlash may be eliminated in the forward direction.

The information may for example be related vehicle positioning information, digital map information, topographical information, curvature information, speed limit information, traffic information, radar-based information, camera-based information, requested vehicle speed information, other vehicle distance information, other vehicle speed information, vehicle weight information, information obtained from other vehicles than the vehicle 100, road information and/or positioning information stored previously on board the vehicle 100, and/or information obtained from traffic systems related to that road section.

The information related to the upcoming road section may be obtained in various ways. It may be determined on the basis of map data, e.g. from digital maps including e.g. topographical information, in combination with positioning information, e.g. GPS (global positioning system) information. The positioning information may be used to determine the location of the vehicle relative to the map data so that the road section information may be extracted from the map data. Various present-day cruise control systems use map data and positioning information. Such systems may then provide the system for the present invention with map data and positioning information, thereby minimizing the additional complexity involved in determining the road section information, such as e.g. a road gradient.

The road section information may thus e.g. be obtained on the basis of a map in conjunction with GPS information. The information may also be obtained by usage of radar equipment, one or more cameras, one or more other vehicles providing information, information storing systems on board, and/or traffic systems related to the upcoming section of road.

The information may be used for performing simulations related to the vehicle 100 for the upcoming road section, such as e.g. one or more future speed profiles for the vehicle speed for the road section. The one or more simulations may therefore be based on the current location of the vehicle and the current situation for the vehicle, and may virtually look ahead along the road section based on the road section information, including e.g. the gradient for the road.

As a non-limiting example, the simulations may be conducted at a predetermined rate, e.g. at a rate of 1 Hz, which means that a new simulation result is provided every second. The section of road for which the simulation is conducted represents a predetermined distance ahead of the vehicle, e.g. it might be 1 km long. The section of road may also be regarded as a horizon ahead of the vehicle, for which the simulation is to be conducted.

The determination of the direction is, according to an embodiment, based on information related to an upcoming usage of the vehicle 100. The upcoming usage may be determined in a number of ways, e.g. based on a driving and/or loading scheme, based on driver input, and/or based on the above-mentioned information related to the upcoming road section. For example, for a bus at a bus stop, it is known that according to its time table, that the bus is soon to leave the bus stop. It may therefore be determined, based on the time table, that the bus will soon move in a specific direction, e.g. the forward direction. Alternatively, essentially any event/action that may be interpreted as an indication of an upcoming drive-off, such as e.g. an opening and/or closing of a door, turning on the lights, or any other suitable driver input, may be utilized as a basis for determining a direction in which the drivetrain should be rotated.

It should be noted that the method steps 210, 211, 212, 213, 214, 215, 216, 217, 218, 220, 230, 240 illustrated in FIGS. 2a-b and described above do not necessarily have to be executed in the order illustrated in FIGS. 2a-b. The steps may essentially be executed in any suitable order, as long as the physical requirements and the information needed to execute each step is available when the step is executed.

According to an embodiment, for a hybrid vehicle, for example a vehicle as the one schematically illustrated in FIG. 1a, including at least one combustion engine 101a and at least one electrical machine 101b as power sources, at least one clutch 106 included in the drivetrain 130 is controlled 213 to a slipping position $C_{slip\_clutch}$. In this slipping position $C_{slip\_clutch}$, the at least one clutch 106 transfers a backlash clutch torque $T_{backlash\_clutch}$ having a controlled value for eliminating the backlash in combination with the backlash torque $T_{backlash}$ provided by the at least one electrical machine 101b, 101c, 101d. The backlash clutch torque $T_{backlash\_clutch}$ is here lower than a torque $T_{closed\_clutch}$ being transferred in a closed position $C_{closed\_clutch}$ for the clutch 106.

Thus, according to this embodiment, the backlash torque $T_{backlash}$ provided by the at least one electrical machine 101b, 101c, 101d and the backlash clutch torque $T_{backlash\_clutch}$ provided by the clutch 106 and combustion engine 101a are used in combination as a combined backlash torque $T_{backlash\_comb}$; $T_{backlash\_comb}=T_{backlash}+T_{backlash\_clutch}$; for eliminating the backlash in the drivetrain 130. Hereby, an efficient backlash elimination may be achieved. Also, since the at least one electrical machine 101b, 101c, 101d has a relatively small rotational inertia $J_{e\_el}$, and the drivetrain has a relatively large rotational inertia $J_{drivetrain}$, it is advantageous to also use the clutch and combustion engine 101a for rotating the drivetrain, due to the relatively larger rotational inertia $J_{e\_comb}$ of the combustion engine. Essentially, the combustion engine and clutch can hereby help the electrical machine to wind up the drivetrain 130, which has a relatively large rotational inertia $J_{drivetrain}$.

As is illustrated in FIGS. 1a-c, the different parts of the drivetrain 130 have different rotational inertias, comprising a rotational inertia $J_{e\_comb}$ for the combustion engine 101a, rotational inertias $J_{e\_el}$ for the one or more electrical machines 101b, 101c, 101d, a rotational inertia $J_g$ for the gearbox 103, a rotational inertia $J_c$ for the clutch 106, a rotational inertia $J_p$ for the propeller shaft 107 and rotational inertias $J_d$ for each drive shaft 104, 105. Generally speaking, all rotating bodies have a rotational inertia J, which depends on the mass of the body and the distance of the mass from the rotational centre. The rotational inertias $J_{e\_el}$ for the one or more electrical machines 101b, 101c, 101d are generally relatively small, at least in comparison with the rotational inertia $J_{e\_comb}$ of the combustion engine 101a. For reasons of clarity, in FIGS. 1a-c, only the above mentioned rotational inertias have been indicated. A person skilled in the art does, however, realize that more rotational inertias may occur in a drivetrain than those listed here.

Generally, the torque T and the change $\dot{\omega}$ of the rotational speed for the rotating shafts/parts are related to each other and to a rotational inertia J according to: $T=J\dot{\omega}$. For the drivetrain, or at least for parts of the drivetrain, the rotational inertia J is known or can be calculated. For example, a value $\dot{\omega}$ for the change in rotational speed of the clutch is dependent at least on a rotational inertia J of one or more parts of the clutch 106 and the gearbox 103. One non-limiting example value for the inertia J for the rotating parts of the clutch 106 and the gearbox 103 can be e.g. 0.5 kg*m². According to an embodiment of the present invention, the controllable value of the backlash clutch torque $T_{backlash\text{-}clutch}$ suitable for eliminating the backlash/play may be empirically determined and may have a value exceeding at least the frictional torques of the gearbox and the drive shafts 104, 105, for example within a range of 10-50 Nm, or within a range of 15-25 Nm, or approximately 20 Nm for the input shaft 109. By usage of such a controllable value for the backlash clutch torque $T_{backlash\_clutch}$, a quick and safe start from a standstill can be provided by the embodiment, without risking unwanted drive-offs.

According to an embodiment, the elimination of the backlash may be determined by an analysis of a length of a time period during which the backlash torque $T_{backlash}$ and/or the backlash clutch torque $T_{backlash\_clutch}$ have been applied on the drivetrain. If the backlash torque $T_{backlash}$ and/or the backlash clutch torque $T_{backlash\_clutch}$ have been applied for a time period $t_{backlash}$ being longer than a predetermined value $t_{backlash\_predet}$; $t_{backlash}>t_{backlash\_predet}$; where the predetermined value $t_{backlash\_predet}$ may be e.g. 0.5 s, the backlash is determined to have been eliminated in the drivetrain.

According to an embodiment, the elimination of the backlash can be determined by an analysis of a difference $\Delta_\omega$ between a rotational speed $\omega_{shaft}$ of an input shaft 109 of the gearbox and a rotational speed $\omega_{wheel}$ of a driving wheel 110, 111 of the vehicle 100. If there is essentially no difference between these rotational speeds after an initial small difference, i.e. if $\Delta_\omega=\omega_{shaft}-\omega_{wheel}=0$, it may be concluded that the backlash has been eliminated in the drivetrain.

For the herein described embodiments utilizing both the at least one electrical machine 101b, 101c, 101d and the combustion engine 101a, the elimination of the backlash can be determined by an analysis of an increase of an engine torque $T_{engine}$ when the clutch 106 is controlled to the slipping position $C_{slip\_clutch}$. If the engine torque $T_{engine}$ increases when the clutch is slightly closed to the slipping position $C_{slip\_clutch}$, and if the increase of the engine torque $T_{engine}$ is correlated to the closing of the clutch to the slipping position $C_{slip\_clutch}$, it can be concluded that the backlashed is eliminated.

As described above, the elimination of the backlash may for example be performed during a standstill of the vehicle 100. Thus, the backlash elimination is then eliminated when the vehicle is standing still, whereby the backlash elimination does not affect the driving performance of the vehicle. For many vehicles, e.g. buses and also other vehicles, standstills e.g. at bus stops and/or traffic lights are a natural part of the use of the vehicles. To be able to drive off after such stops with a drivetrain free from backlash/play is a great advantage.

A vehicle standstill determination can be made in a couple of ways. The standstill determination may for example be performed based on if an output shaft 107 from the gearbox rotates or not, e.g. based on a number of shaft revolutions signal provided by a sensor arranged at the output shaft 107. The standstill determination may also be made based on a determined acceleration of the vehicle, for example based on an acceleration signal provided by an accelerometer in the vehicle 100. The standstill determination may also be made based on a determined rotation or non-rotation of one or more wheels in the vehicle, for example based on a number of wheel revolutions signal provided by a sensor at a wheel in the vehicle 100. The standstill determination may also be made based on a determination of if brakes, such as e.g. service/foot brakes, are activated in the vehicle, e.g. based on a brake pedal signal provided by a brake system in the vehicle 100. The standstill determination may also be made based on a geographical movement of the vehicle, e.g. based on GPS-signals (Global Positioning System signals) utilized in a GPS device in the vehicle. The signals used for the above described determination of that the vehicle is standing still are normally already available in the vehicle. These embodiments can thus be implemented without adding to the hardware complexity of the vehicle 100.

As mentioned above, the elimination of the backlash may also be performed during a movement of the vehicle 100 which is caused by a kinetic energy of the vehicle 100 without torque being transferred from the one or more power sources 101a, 101b, 101c, 101d to the at least one drive wheel 110, 111, i.e. during dragging/engine motoring and/or freewheeling. A determination of if the vehicle utilizes engine motoring and/or freewheeling may be based on a number of indications, parameters and/or signals present in the vehicle, e.g. based on a neutral gear indication/signal, on an open clutch indication/signal, on an injected fuel indication/signal, and/or on an indication that no torque is provided by the at least one electrical machine.

The above described methods for determining that the backlash has been eliminated can be made based on information and/or signals normally already being available in the vehicle, and can thus be implemented without adding to the hardware complexity for the vehicle 100.

FIGS. 4a-c, 5a-c, 6a-c and 7a-c show some non-limiting examples of a drive-off situation for which herein disclosed embodiments may be used. In these figures, in addition to the elimination of the backlash, also various embodiments for keeping the backlash eliminated until drive-off are schematically illustrated. As is understood by a skilled person, as is described above, at least one of the herein presented embodiments may also be used correspondingly in connection with an end of an engine motoring period and/or with an end of a freewheeling period, as mentioned above.

As is schematically illustrated in FIGS. 4a-c, the at least one electrical machine is used for eliminating the backlash and also for keeping the backlash eliminated. Here, the torque provided by the electrical machine is according to an embodiment initially increased 401 to the above mentioned backlash torque $T_{backlash}$, which has a controlled value for turning the drivetrain 130 if there is a backlash present in the drivetrain. The backlash torque $T_{backlash}$ is provided 402 until the backlash has been eliminated 406. Then, the torque of the electrical machine is decreased 403 to a holding torque $T_{hold}$, which has a value ensuring that the backlash is kept eliminated, i.e. a value preventing that backlash occurs again in the drivetrain. The holding torque $T_{hold}$ is applied 404 until the drive-off indication is given 407 a value (on) corresponding to a drive-off indication. After the drive-off indication, the torque provided by the electrical machine increases again 405, in relation to the requested drive-off torque. Thus, according to the embodiment illustrated in FIGS. 4a-c, the backlash is kept eliminated by the at least one electrical machine 101b, 101c, 101d alone.

FIGS. 5a-c illustrate an embodiment which utilizes a shaft brake for keeping the backlash eliminated. Here, the torque provided by the electrical machine is according to an embodiment initially increased 501 to the above mentioned backlash torque $T_{backlash}$. The backlash torque $T_{backlash}$ is provided 502 until the backlash has been eliminated 506. Then, a braking torque $T_{brake}$ is applied on a shaft 109, 902, 905 of the gearbox 103 by setting the shaft brake indication to an on value. The braking torque $T_{brake}$ has a value ensuring that the backlash is kept eliminated. Also, the torque of the electrical machine is decreased 503 to essentially zero. The braking torque $T_{brake}$ is applied 504 until short after the drive-off indication is given 507 a value (on) corresponding to a drive-off indication. After the drive-off indication, the torque provided by the electrical machine increases again 505, in relation to the requested drive-off torque. Thus, according to the embodiment illustrated in FIGS. 5a-c, the backlash is eliminated by the at least one electrical machine 101b, 101c, 101d, and the backlash is kept eliminated by the shaft brake.

FIGS. 6a-c illustrate an embodiment which utilizes a combined use of the shaft brake and the at least one electrical machine for keeping the backlash eliminated. Here, the torque provided by the electrical machine is according to an embodiment initially increased 601 to the above mentioned backlash torque $T_{backlash}$. The backlash torque $T_{backlash}$ is provided 602 until the backlash has been eliminated 606. Then, a braking torque $T_{brake}$ is applied on a shaft 109, 902, 905 of the gearbox 103, and the torque of the electrical machine is decreased 603 to a holding torque $T_{hold}$. The braking torque $T_{brake}$ and the holding torque $T_{hold}$ together have a combined value ensuring that the backlash is kept eliminated. The braking torque $T_{brake}$ and the holding torque $T_{hold}$ are applied 604 until the drive-off indication is given 607 a value (on) corresponding to a drive-off. After the drive-off indication 607, the torque provided by the electrical machine increases again 605, in relation to the requested drive-off torque. Thus, according to the embodiment illustrated in FIGS. 6a-c, the backlash is eliminated by the at least one electrical machine 101b, 101c, 101d, and the backlash is kept eliminated by a combined use of the shaft brake and the at least one electrical machine 101b, 101c, 101d.

FIGS. 7a-c illustrate an embodiment which utilizes a gear box friction for keeping the backlash eliminated. Here, the torque provided by the electrical machine is according to an embodiment initially increased 701 to the above mentioned backlash torque $T_{backlash}$. The backlash torque $T_{backlash}$ is provided 702 until the backlash has been eliminated 706. Then, the torque of the electrical machine is decreased 603 essentially to a zero value. The internal friction of the gearbox keeps the backlash eliminated 704 until the drive-off indication is given 707 a value (on) corresponding to a drive-off. After the drive-off indication 707, the torque provided by the electrical machine increases again 705, in relation to the requested drive-off torque. Thus, according to the embodiment illustrated in FIGS. 7*a*-*c*, the backlash is eliminated by the at least one electrical machine 101*b*, 101*c*, 101*d*, and the backlash is kept eliminated by the gear box friction.

As is understood by a skilled person, the principles schematically illustrated in FIGS. 4*a*-*c*, FIGS. 5*a*-*c*, FIGS. 6*a*-*c* and FIGS. 7*a*-*c*, are also applicable for the herein described embodiments in which a combined control of the at least one electrical machine and the clutch is used for eliminating the backlash. The torque electrical machine in the figures would then correspond to a combined clutch and electrical machine torque, and the backlash torque $T_{backlash}$ in the figures would then correspond to above mentioned combined backlash torque $T_{backlash\_comb}$.

When the vehicle is set in motion, as illustrated in FIGS. 4*a*-*c*, FIGS. 5*a*-*c*, FIGS. 6*a*-*c* and FIGS. 7*a*-*c*, the drivetrain is by usage of the herein disclosed embodiments guaranteed to be free of backlash when the drive-off indication is activated, which reduces the necessity of backlash related restrictions for the torque to be requested during drive-off. Thus, the backlash is here eliminated already during the standstill, i.e. already before the drive-off. Hereby, the herein described embodiments offer much faster drive-offs of the vehicle, which will be perceived by the driver as the vehicle having a fast torque response and being powerful.

According to an aspect of the present invention, a system for a vehicle for eliminating a backlash of a drivetrain 130 included in a vehicle 100 is presented. As mentioned above, the vehicle 100 includes one or more power sources 101*a*, 101*b*, 101*c*, 101*d* including at least one electrical machine 101*b*, 101*c*, 101*d*. The vehicle further includes a drivetrain 130 for transferring torque between the one or more power sources 101*a*, 101*b*, 101*c*, 101*d* and at least one drive wheel 110, 111 of the vehicle 100.

The system for eliminating the backlash includes means for controlling 210, when essentially no positive drive torque $T_{drive}$ is transferred from the drivetrain 130 to the at least one drive wheel 110, 111, the at least one electrical machine 101*b*, 101*c*, 101*d* to provide a backlash torque $T_{backlash}$ to the drivetrain 130, wherein the backlash torque $T_{backlash}$ has a controlled value for turning/rotating the drivetrain 130 if there is a backlash present in the drivetrain 130. The system may further, according to an embodiment, include means for detecting 220 that the backlash is eliminated by the provided backlash torque $T_{backlash}$.

With reference to FIGS. 1*a*-*c*, 8 and 9, the system may, according to various embodiments described herein include at least one electrical machine control unit 121, at least one combustion engine control unit 122, at least one gearbox control unit 123 and/or at least one clutch control unit 124. The herein described embodiments may be implemented at least partly in one or more of these control units 121, 122, 123, 124.

The system according to the present invention may be arranged for performing all of the above, in the claims, and in the herein described embodiments method steps. The system is hereby provided with the above described advantages for each respective embodiment. The present invention is also related to a vehicle 100, such as e.g. a truck, a bus or a passenger car, including the herein described system for controlling a backlash of a drivetrain.

The person skilled in the art will appreciate that a the herein described embodiments for controlling a backlash of a drivetrain may also be implemented in a computer program, which, when it is executed in a computer, instructs the computer to execute the method. The computer program is usually constituted by a computer program product 803 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 8:
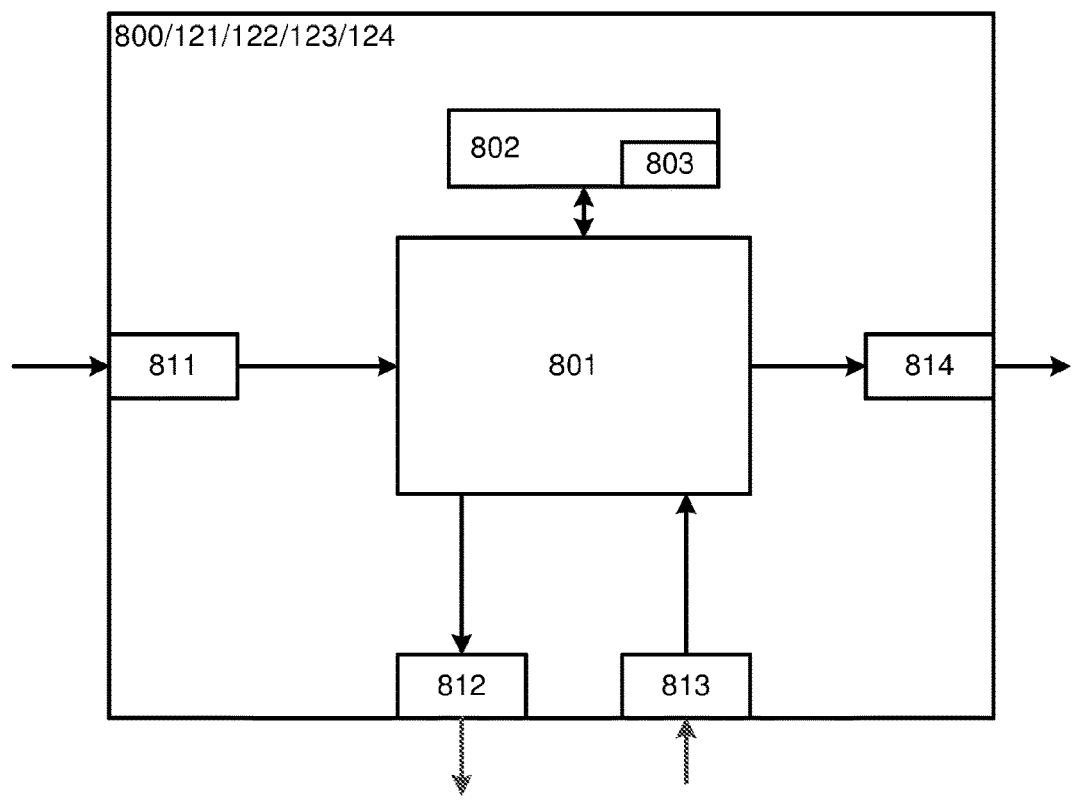
FIG. 8 shows a control unit, in which a method according to any one of the herein described embodiments may be implemented, and FIG. 9 schematically shows an input shaft brake arrangement according to an embodiment.

FIG. 8 shows in schematic representation a control unit 800, which may correspond to one or more of the above mentioned control units 121, 122, 123, 124. The control unit 800 comprises a computing unit 801, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 801 is connected to a memory unit 802 arranged in the control unit 800, which memory unit provides the computing unit 801 with, for example, the stored program code and/or the stored data which the computing unit 801 requires to be able to perform computations. The computing unit 801 is also arranged to store partial or final results of computations in the memory unit 802.

In addition, the control unit 800 is provided with devices 811, 812, 813, 814 for receiving and transmitting input and output signals. These input and output signals can contain waveforms, impulses, or other attributes which, by the devices 811, 813 for the reception of input signals, can be detected as information and can be converted into signals which can be processed by the computing unit 801. These signals are then made available to the computing unit 801. The devices 812, 814 for the transmission of output signals are arranged to convert signals received from the computing unit 801 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 801 and that the above-stated memory can be constituted by the memory unit 802.

Control systems in modern vehicles commonly comprise communication bus systems consisting of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1*a*-*c*, 8 and 9, which is well known to the person skilled in the art within this technical field.

In the shown embodiment, the present invention is implemented in the one or more above mentioned control units 121, 122, 123, 124. The invention can also, however, be implemented wholly or partially in one or more other control units already present in the vehicle, or in some control unit dedicated to the present invention.

Here and in this document, units are often described as being arranged for performing steps of the method according to the invention. This also includes that the units are designed to and/or configured to perform these method steps.

The one or more control units 121, 122, 123, 124 are e.g. in FIGS. 1a-c illustrated as separately units. These units 121, 122, 123, 124 may, however, be logically separated by physically implemented in the same unit, or can be both logically and physically arranged together. These units 121, 122, 123, 124 may for example correspond to groups of instructions, which can be in the form of programming code, that are input into, and are utilized by a processor/computing unit 801 when the units are active and/or are utilized for performing its method step, respectively.

The present invention is not limited to the above described embodiments. Instead, the present invention relates to, and encompasses all different embodiments being included within the scope of the independent claims.

The invention claimed is:

1. A method for use in a vehicle wherein the vehicle comprises:
   one or more power sources including at least one electrical machine; and a drivetrain for transferring torque between the one or more power sources and at least one drive wheel of the vehicle,
   wherein the method comprises:
   controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain to thereby substantially eliminate the backlash; and
   keeping the backlash substantially eliminated at least until a request for a drive torque ($T_{drive}$) accelerating the vehicle is detected, wherein keeping of the backlash substantially eliminated is achieved by applying a braking torque ($T_{brake}$) on a shaft of a gearbox included in the drivetrain.

2. A method according to claim 1, wherein the backlash torque ($T_{backlash}$) is higher than a frictional torque ($T_{friction}$) of the drivetrain, and is lower than a maximal torque ($T_{max}$) being provided by the at least one electrical machine.

3. A method according to claim 1, wherein controlling the at least one electrical machine to provide a backlash torque ($T_{backlash}$) to the drivetrain comprises:
   controlling, when no request for a drive torque ($T_{drive}$) for accelerating the vehicle is detected, the at least one electrical machine to provide a backlash torque ($T_{backlash}$) to the drivetrain, the backlash torque ($T_{backlash}$) having a controlled value for turning the drivetrain if there is a backlash present in the drivetrain to thereby substantially eliminate the backlash.

4. A method according to claim 1, wherein the keeping of the backlash substantially eliminated is further achieved by at least one in the group of:
   providing, by use of the at least one electrical machine, a holding torque ($T_{hold}$) to the drivetrain; and
   a friction of a gearbox of the drivetrain.

5. A method according to claim 1, further comprising:
   transferring, when the backlash is still substantially eliminated in the drivetrain, a drive torque ($T_{drive}$) accelerating the vehicle from the drivetrain to the at least one drive wheel.

6. A method according to claim 1, wherein the controlling of the at least one electrical machine further comprises:
   providing the backlash torque ($T_{backlash}$) to the drivetrain;
   detecting that the drivetrain is turning as a result of the provided backlash torque ($T_{backlash}$);
   detecting that the drivetrain stops turning;
   determining, based on the detection of the stopped turning of the drivetrain, that the backlash has been substantially eliminated; and
   controlling the provided backlash torque ($T_{backlash}$) to decrease.

7. A method according to claim 1, wherein the controlling of the at least one electrical machine to provide a backlash torque ($T_{backlash}$) to the drivetrain further comprises:
   determining a direction of an upcoming acceleration of the vehicle; and
   controlling the at least one electrical machine to provide a backlash torque ($T_{backlash}$) to the drivetrain such that the backlash is substantially eliminated in the direction of the upcoming acceleration.

8. A method according to claim 7, wherein the determining of the direction is based on one or more in the group of:
   a gear selector indication;
   information related to a road section ahead of the vehicle; and
   information related to an upcoming usage of the vehicle.

9. A method according to claim 1, further comprising:
   controlling at least one clutch included in the drivetrain to a slipping position ($C_{slip\_clutch}$), in which slipping position ($C_{slip\_clutch}$) the at least one clutch transfers a backlash clutch torque ($T_{backlash\_clutch}$) having a controlled value for substantially eliminating the backlash in combination with the backlash torque ($T_{backlash}$) provided by the at least one electrical machine.

10. A method according to claim 9, wherein the backlash clutch torque ($T_{backlash\_clutch}$) is lower than a torque ($T_{closed\_clutch}$) being transferred in a closed position ($C_{closed\_clutch}$) for the clutch.

11. A method according to claim 1, wherein essentially no drive torque ($T_{drive}$) is transferred from the drivetrain to the at least one drive wheel during one or more in the group of:
   a vehicle standstill; and
   a movement of the vehicle which is caused by a kinetic energy of the vehicle without torque being transferred from the one or more power sources to the at least one drive wheel.

12. A computer program product comprising computer program code stored on a non-transitory computer-readable medium, said computer program product used in a vehicle comprising:
   one or more power sources including at least one electrical machine; and
   a drivetrain for transferring torque between the one or more power sources and at least one drive wheel of the vehicle, said computer program code comprising computer instructions to cause one or more control units to perform the following operations:
   controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain; and
   keeping the backlash substantially eliminated at least until a request for a drive torque ($T_{drive}$) accelerating the vehicle is detected, wherein keeping of the backlash substantially eliminated is achieved by applying a braking torque ($T_{brake}$) on a shaft of a gearbox included in the drivetrain.

13. A vehicle comprising:
one or more power sources including at least one electrical machine;
a drivetrain for transferring torque between the one or more power sources and at least one drive wheel of the vehicle; and
a system comprising:
means for controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain; and
means for keeping the backlash substantially eliminated at least until a request for a drive torque ($T_{drive}$) accelerating the vehicle is detected, wherein keeping of the backlash substantially eliminated is achieved by applying a braking torque ($T_{brake}$) on a shaft of a gearbox included in the drivetrain.

14. A system for use in a vehicle, wherein the vehicle comprises:
one or more power sources including at least one electrical machine; and a drivetrain for transferring torque between the one or more power sources and at least one drive wheel of the vehicle,
wherein the system comprises:
means for controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain; and
means for keeping the backlash substantially eliminated at least until a request for a drive torque ($T_{drive}$) accelerating the vehicle is detected, wherein keeping of the backlash substantially eliminated is achieved by applying a braking torque ($T_{brake}$) on a shaft of a gearbox included in the drivetrain.

15. A system according to claim 14, wherein means for controlling the at least one electrical machine to provide a backlash torque ($T_{backlash}$) to the drivetrain comprises:
means for controlling, when no request for a drive torque ($T_{drive}$) for accelerating the vehicle is detected, the at least one electrical machine to provide a backlash torque ($T_{backlash}$) to the drivetrain, the backlash torque ($T_{backlash}$) having a controlled value for turning the drivetrain if there is a backlash present in the drivetrain to thereby substantially eliminate the backlash.

16. A method for use in a vehicle wherein the vehicle comprises:
one or more power sources including at least one electrical machine; and a drivetrain for transferring torque between the one or more power sources and at least one drive wheel of the vehicle,
wherein the method comprises:
controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain, wherein the controlling of the at least one electrical machine to provide a backlash torque ($T_{backlash}$) to the drivetrain further comprises:
determining a direction of an upcoming acceleration of the vehicle; and
controlling the at least one electrical machine to provide a backlash torque ($T_{backlash}$) to the drivetrain such that the backlash is substantially eliminated in the direction of the upcoming acceleration.

17. A method according to claim 16, wherein the determining of the direction is based on one or more in the group of:
a gear selector indication;
information related to a road section ahead of the vehicle; and
information related to an upcoming usage of the vehicle.

18. A method for use in a vehicle wherein the vehicle comprises:
one or more power sources including at least one electrical machine; and a drivetrain for transferring torque between the one or more power sources and at least one drive wheel of the vehicle,
wherein the method comprises:
controlling, when no positive drive torque ($T_{drive}$) is transferred from the drivetrain to the at least one drive wheel, the at least one electrical machine to provide a backlash torque ($T_{backlash}$) to the drivetrain, the backlash torque ($T_{backlash}$) having a controlled value for turning the drivetrain if there is a backlash present in the drivetrain; and
controlling at least one clutch included in the drivetrain to a slipping position ($C_{slip\_clutch}$), in which slipping position ($C_{slip\_clutch}$) the at least one clutch transfers a backlash clutch torque ($T_{backlash\_clutch}$) having a controlled value for substantially eliminating the backlash.

19. A method according to claim 18, wherein the backlash clutch torque ($T_{backlash\_clutch}$) is lower than a torque ($T_{closed\_clutch}$) being transferred in a closed position ($C_{closed\_clutch}$) for the clutch.

\* \* \* \* \*